(12) United States Patent
Arngren et al.

(10) Patent No.: US 11,194,889 B2
(45) Date of Patent: Dec. 7, 2021

(54) METHODS, APPARATUSES, COMPUTER PROGRAMS, COMPUTER PROGRAM PRODUCTS AND SYSTEMS FOR SHARING CONTENT

(71) Applicant: Telefonaktiebolaget LM Ericsson (publ), Stockholm (SE)

(72) Inventors: Tommy Arngren, Södra Sunderby (SE); Johan Kristiansson, Luleå (SE)

(73) Assignee: TELEFONAKITEBOLAGET LM ERICSSON (PUBL), Stockholm (SE)

( * ) Notice: Subject to any disclaimer, the term of this patent is extended or adjusted under 35 U.S.C. 154(b) by 62 days.

(21) Appl. No.: 16/470,000

(22) PCT Filed: Dec. 15, 2016

(86) PCT No.: PCT/SE2016/051260
§ 371 (c)(1),
(2) Date: Jun. 14, 2019

(87) PCT Pub. No.: WO2018/111160
PCT Pub. Date: Jun. 21, 2018

(65) Prior Publication Data
US 2020/0012763 A1    Jan. 9, 2020

(51) Int. Cl.
*G06F 21/10*    (2013.01)
*G06F 16/23*    (2019.01)
(Continued)

(52) U.S. Cl.
CPC .......... *G06F 21/10* (2013.01); *G06F 16/2379* (2019.01); *H04L 9/0825* (2013.01);
(Continued)

(58) Field of Classification Search
CPC ................. G06F 21/10; G06F 16/2379; G06F 2221/0731; H04L 9/14; H04L 9/3247; H04L 2209/38; H04L 2209/60
See application file for complete search history.

(56) References Cited

U.S. PATENT DOCUMENTS 9,374,559 B1    6/2016  Beguin
2003/0221105 A1*  11/2003  Bajaj ....................... G06F 21/64
                                                    713/176
(Continued)

FOREIGN PATENT DOCUMENTS

CA    2 813 758 A1    4/2012
CN    106100981 A    11/2016
WO    2015/164521 A1    10/2015

OTHER PUBLICATIONS

International Search Report and Written Opinion dated Sep. 7, 2017 issued in International Application No. PCT/SE2016/051260. (15 pages).

(Continued)

*Primary Examiner* — Paul E Callahan
(74) *Attorney, Agent, or Firm* — Rothwell, Figg, Ernst & Manbeck, P.C.

(57) ABSTRACT

This disclosure aims to overcome at least some of the drawbacks associated with today's content sharing applications. In one aspect, this disclosure enables decentralized sharing of content based on crypto protocols and distributed database technology (e.g., blockchain technology). In one aspect, the content to be shared is encrypted and included in a session document that is stored in a distributed database that can be shared without requiring a central administrator.

23 Claims, 10 Drawing Sheets

(51) Int. Cl.
*H04L 9/08* (2006.01)
*H04L 9/14* (2006.01)
*H04L 9/32* (2006.01)

(52) U.S. Cl.
CPC .............. *H04L 9/14* (2013.01); *H04L 9/3247* (2013.01); *G06F 2221/0731* (2013.01); *H04L 2209/38* (2013.01); *H04L 2209/60* (2013.01)

(56) References Cited

U.S. PATENT DOCUMENTS

| | | |
|---|---|---|
| 2010/0235649 A1 | 9/2010 | Jeffries et al. |
| 2016/0261690 A1 | 9/2016 | Ford |
| 2016/0299918 A1 | 10/2016 | Ford |

OTHER PUBLICATIONS

Smarty, A. "9 Free Tools to Co-Create Content", Content Marketing Institute, (Sep. 2015), http://contentmarketinginstitute.com/2015/09/tools-cocreate-content/. (22 pages).

Zyskind, Guy et al., "Decentralizing Privacy: Using Blockchain to Protect Personal Data", 2015 IEEE CS Security and Privacy Workshops, May 2015 (pp. 180-184).

Azaria, Asaph et al., "MedRec: Using Blockchain for Medical Data Access and Permission Management", 2016 2nd International Conference on Open and Big Data (OBD), IEEE, Aug. 2016 (pp. 25-30).

\* cited by examiner

METHODS, APPARATUSES, COMPUTER PROGRAMS, COMPUTER PROGRAM PRODUCTS AND SYSTEMS FOR SHARING CONTENT

CROSS REFERENCE TO RELATED APPLICATION(S)

This application is a 35 U.S.C. § 371 National Stage of International Patent Application No. PCT/SE2016/051260, filed Dec. 15, 2016, designating the United States.

TECHNICAL FIELD

Aspects of this disclosure relate to methods, apparatuses, computer programs, computer program products and systems for sharing content.

BACKGROUND

In today's technological environment, it is easy for users to share content. For example, many people carry mobile phones with camera capabilities, thus making it very easy to capture photographs and video clips for instant sharing via social media applications, such as, for example, Facebook, Snapchat etc.

Today, the way many social media applications work is that a user, using a client side social media application, creates and uploads (i.e., "posts") to a social media server a message to be shared with the user's friends, followers etc.

The Snapchat application enables a user to capture a picture or video together with a message (collectively referred to as a "Snap"), which are sent to Snapchat friends. Snapchat temporarily collects, processes and stores the contents of the Snap (such as photos, videos and/or captions) on its servers. The contents of the Snap are also temporarily stored on the devices of recipients. Content is automatically deleted (ephemeral), from servers and devices, once all recipients have viewed the Snap.

There also exist applications that enable several users to edit and access a shared file using shared folders (Dropbox is an example of such an application). An administrator is responsible for each folder and makes sure the right people have access to the right files. Access to files is determined on a per-folder basis.

Photo editing applications (e.g., Pixlr) provides a cloud-based set of image tools and utilities, including a number of photo editors, a screen grabber browser extension, and a photo sharing service. The apps range from simple to advanced photo editing. It can be used on PCs, and on smartphones or tablets using a mobile app.

There are also a many different collaborative content creation tools (e.g., collaborative whiteboard apps) used for co-creation of documents, e-book stories, drawings, song etc. by involving others like followers, audiences, colleagues, friends etc., and as disclosed in http://contentmarketinginstitute.com/2015/09/tools-cocreate-content/, retrieved on 13 Dec. 2016.

SUMMARY

The content sharing applications available today suffer from various drawbacks. For example, while some existing content sharing application enable online, collaborative sharing of documents, it is difficult to avoid unwanted re-publishing or sharing of the content. As another example, some content sharing applications (e.g., Snapchat) store content temporarily on devices and on a server, but such applications do not offer any guaranties that content is kept secret. Existing applications are based on centralized service control and the service providers have full control of the content and communication transactions.

This disclosure aims to overcome at least some of the drawbacks associated with today's content sharing applications. In one aspect, this disclosure enables decentralized sharing of content based on crypto protocols and distributed database technology (e.g., blockchain technology). In one aspect, the content to be shared (e.g., a photograph with captions) is encrypted and included in a session document that is stored in a distributed database that can be shared without requiring a central administrator (e.g., a blockchain or other de-centralized databases). This contrasts with traditional (SQL or NoSQL) databases that are controlled by a single entity. In some embodiments, the session document can only be manipulated by interacting with a group session agent (GSA), which may be implemented as a so called "Smart Contract." In such embodiments, each GSA maintains a copy of the distributed database and each GSA is configured such that it will not modify the state of the database that it maintains without first reaching a consensus with other GSAs. In some embodiments, the GSA is tamper resistant due to the use of the blockchain technology. That is, no one can manipulate the session document without authorization, and, further, as no one person or entity has full control the blockchain, the blockchain can be trusted.

In some embodiments, the GSA is configured to enforce access control with respect to the session documents stored in the GSA's database. For example, an owner of content can set rules with respect to who may access, modify, and/or re-publish the content contained in a session document. Preferably, the content stored in a session document is encrypted and the GSAs do not have access to the encryption key that is needed to decrypt the content, but the encryption key is available to those whom the owner of the content provides permission to access and/or modify the content (such persons are referred to as "recipients"). With this solution, it is only the owner and recipients that are able to access and manipulate the shared content.

Accordingly, in one aspect there is provided a method for sharing content that is performed by a first group session agent (GSA). In some embodiments the method includes: obtaining, at the first GSA, session document transaction information associated with a session document transaction, wherein the session document transaction information was transmitted by a user device, and the session document transaction information comprises: a first user identifier for identifying a first user, a session document identifier for identifying a session document; an operation code for identifying an operation to be performed with respect to the session document, and a digital signature. The method further includes, the first GSA using the first user identifier to obtain an encryption key associated with the first user identifier. The method further includes the first GSA determining whether the digital signature is a valid digital signature using the obtained encryption key. The method also includes the first GSA obtaining a rule contained in the session document identified by the session document identifier. The method further includes the first GSA determining whether the rule indicates that the first user identified by the first user identifier has the authority to perform the operation on the identified session document. The method also includes, as a result of determining that the signature is valid and the rule indicates that the user has the authority to perform the operation, the first GSA transmitting to at least a subset of a set of other GSAs a transaction confirmation message comprising an indicator indicating that the session document transaction is valid, said set of other GSAs including a second GSA and a third GSA (the confirmation message may further comprise the obtained session document transaction information). The method also includes the first GSA determining the validity of the session document transaction using a distributed consensus algorithm (e.g., the first GSA determines whether at least a certain number of other GSAs included in said set of other GSAs have determined that the session document transaction is valid). The method further includes, as a result of determining that the session document transaction is valid, the first GSA performing the operation with respect to the session document.

In some embodiments, the session document comprises: i) encrypted content data that can be decrypted using a first encryption key, ii) the first user identifier, and iii) a first encrypted version of the first encryption key, wherein the first encrypted version of the first encryption key was encrypted using a second encryption key belonging to the first user (e.g., the first user's public key). In such embodiments, performing the operation with respect to the session document may include the first GSA transmitting to the first user the first encrypted version of the first encryption key and the encrypted content data. In some embodiments, the session document further comprises: an owner identifier identifying the owner of the encrypted content and a second encrypted version of the first encryption key, wherein the second encrypted version of the first encryption key was encrypted using a third encryption key associated with the owner of the encrypted content (e.g., the owner's public key).

In another aspect there is provided a GSA apparatus that is adapted to perform the above described method.

In another aspect there is provided a method for sharing content that is performed by a communication device. That is, a communication device is adapted to perform the method. In some embodiments, the method includes obtaining an indication that an owner of the content desires to share the content with a first recipient. The method further includes encrypting the content to be shared, thereby creating an encrypted version of the content to be shared, wherein the encrypted version of the content to be shared can be decrypted using a first encryption key (a.k.a., "secret" encryption key). The method also includes obtaining a second encryption key, wherein the second encryption key belongs to the first recipient. The method further includes encrypting the first encryption key using the second encryption key belonging to the first recipient, thereby creating a first encrypted version of the first encryption key. The method also includes generating a session document, wherein the session document comprises: 1) an owner identifier identifying the owner of the content, 2) a session document identifier for identifying the session document, 3) the first encrypted version of the first encryption key, 4) the encrypted version of the content to be shared, 5) and a rule comprising a first user identifier identifying the first recipient and information indicating a set of operations the first recipient may perform on the session document. The method further includes publishing the session document.

In some embodiments, the method further comprises encrypting the first encryption key using an encryption key belonging to the owner of the content, thereby creating a second encrypted version of the first encryption key, and the session document further comprises the second encrypted version of the first encryption key.

In some embodiments, publishing the session document comprises transmitting to a group session agent (GSA) a message comprising the session document. In some embodiments, publishing the session document comprises transmitting to a set of two or more GSAs the message comprising the session document. In either embodiment, the message may further comprise a digital signature for use in determining that the session document was generated on behalf of the owner of the content, wherein the digital signature was generated using a private key belonging to the owner of the content.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments.

DETAILED DESCRIPTION

Figure 1:
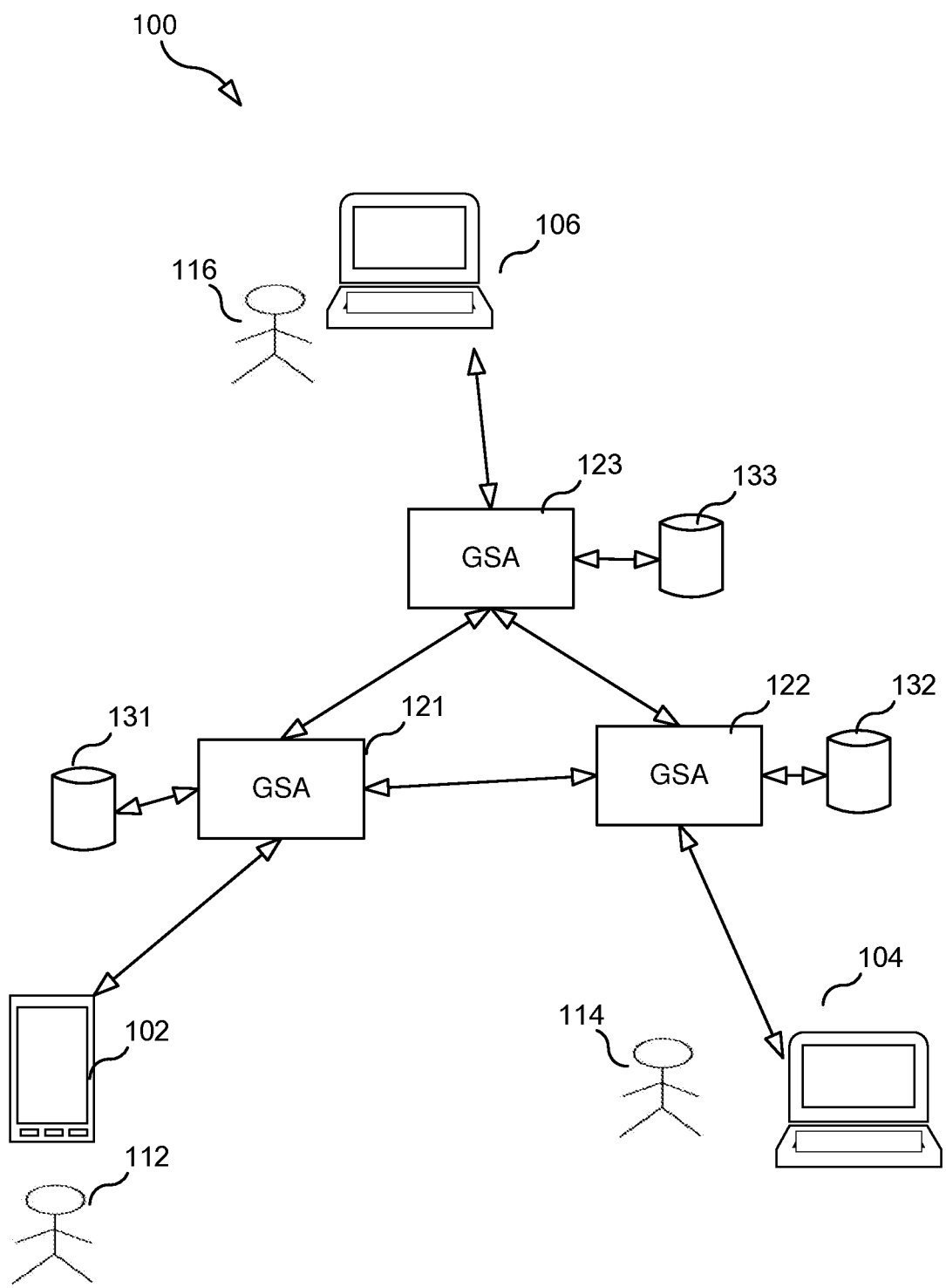
FIG. 1 illustrates a system according to some embodiments.

As described in summary above, this disclosure enables decentralized sharing of content based on crypto protocols and distributed ledger technology (e.g., blockchain technology). In one aspect, content to be shared (e.g., a photograph with captions) is encrypted and included in a session document that is stored in a distributed database and that can be shared without requiring a central administrator. In some embodiments, the session document can only be manipulated by interacting with a group session agent (GSA). In such embodiments, each GSA maintains a copy of the distributed database and each GSA is configured such that it will not modify the state of the database that it maintains without first reaching a consensus with other GSAs FIG. 1 illustrates an example content sharing system 100 according to some embodiments. In the example shown, system 100 includes three GSAs (GSA 121, GSA 122, and GSA 123), but in other embodiments system 100 may have fewer or more GSAs. Each GSA shown in FIG. 1 manages a corresponding database (i.e., GSA 121 manages database 131; GSA 122 manages database 132; and GSA 123 manages database 133). It is assumed that the databases 131-133 are synchronized such that each database stores the same information.

In this example shown, we shall assume that user 112 is in possession of content that user 112 would like to share with users 114 and 116. For example, user 112 may have used his communication device 102 (which in this example is a mobile phone) to take a video and user 112 wants to share the video with users 114 and 116, who are friends of user 112, and further wants to allow users 114 and 116 to add content (e.g., comments) to the video. In such a scenario, user 112 is referred to as the "owner" of the content and user 114 and 116 are referred to as the "recipients." While user 112 is referred to as the "owner" of the content, this is not meant to imply that the user 112 necessarily possesses legal ownership of the content, rather it signifies that the user 112 is in possession of the content to be shared.

To share the content using the content sharing system 100, user 112, in some embodiments, must first install a group session app 200 (see FIG. 2) on communication device 102 and register with the system 100. In some embodiments, user 112 registers with system 100 by selecting a unique user identifier (e.g., user 112 may use his email address as his user ID or a made up alias or his/her real name) and publishing his selected user ID and his encryption key, such as, for example, the user's public encryption key (or "public key" for short) associated with the user in a public key cryptography system (asymmetric cryptography) so that they are available to one or more of the GSAs. In one embodiment, user 112 publishes his user ID and encryption key by transmitting the user ID and encryption key to a single GSA (e.g., GSA 121), which then checks its corresponding database 131 to determine whether the user ID is unique (i.e., database 131 may be used to store each user's user ID and encryption key) and, if it is, the GSA forwards the user ID and encryption key to the other GSAs in the system, each of which performs its own check of its corresponding database to determine whether the user ID is unique. If a consensus is reached among the GSAs that the user ID is unique, each GSA will store the user ID together with the encryption key in its corresponding database. That is, for example, each GSA upon determining that the user ID is unique will communicate to the other GSAs a positive acknowledgement ("ACK") indicating that the GSA has determined the user ID to be unique. In this way, a GSA can determine whether the consensus has been reached. In other embodiments, rather than the user transmitting the user ID and encryption key to a single GSA, the user's communication device may broadcast the user ID and encryption key to the GSAs in system 100. In any event, each GSA will update its corresponding database in the event that a consensus is reached.

Figure 2:
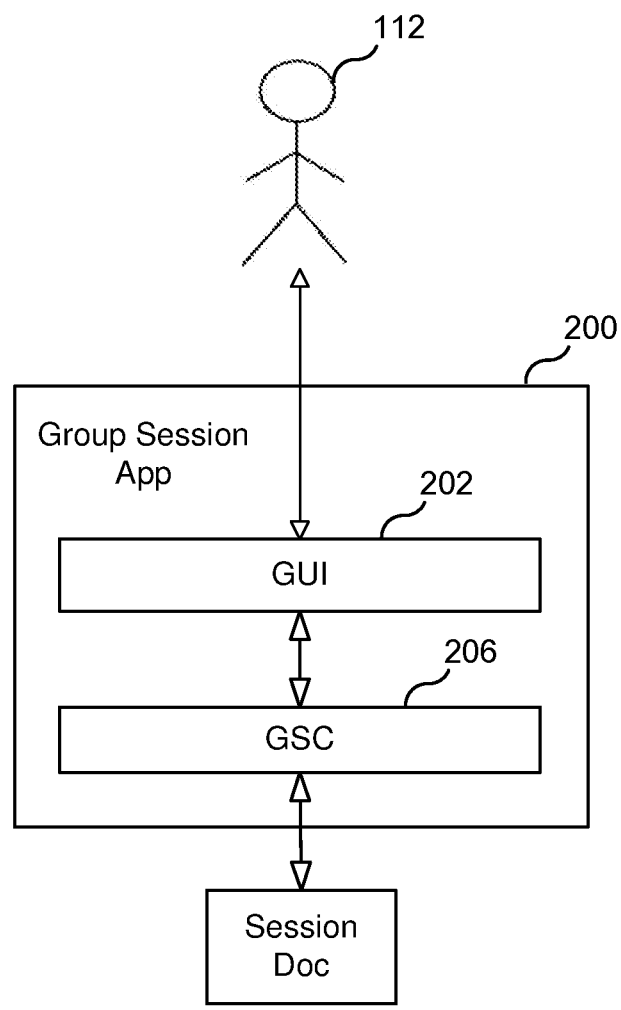
FIG. 2 illustrates components of a group session app according to some embodiments.
Figure 3:
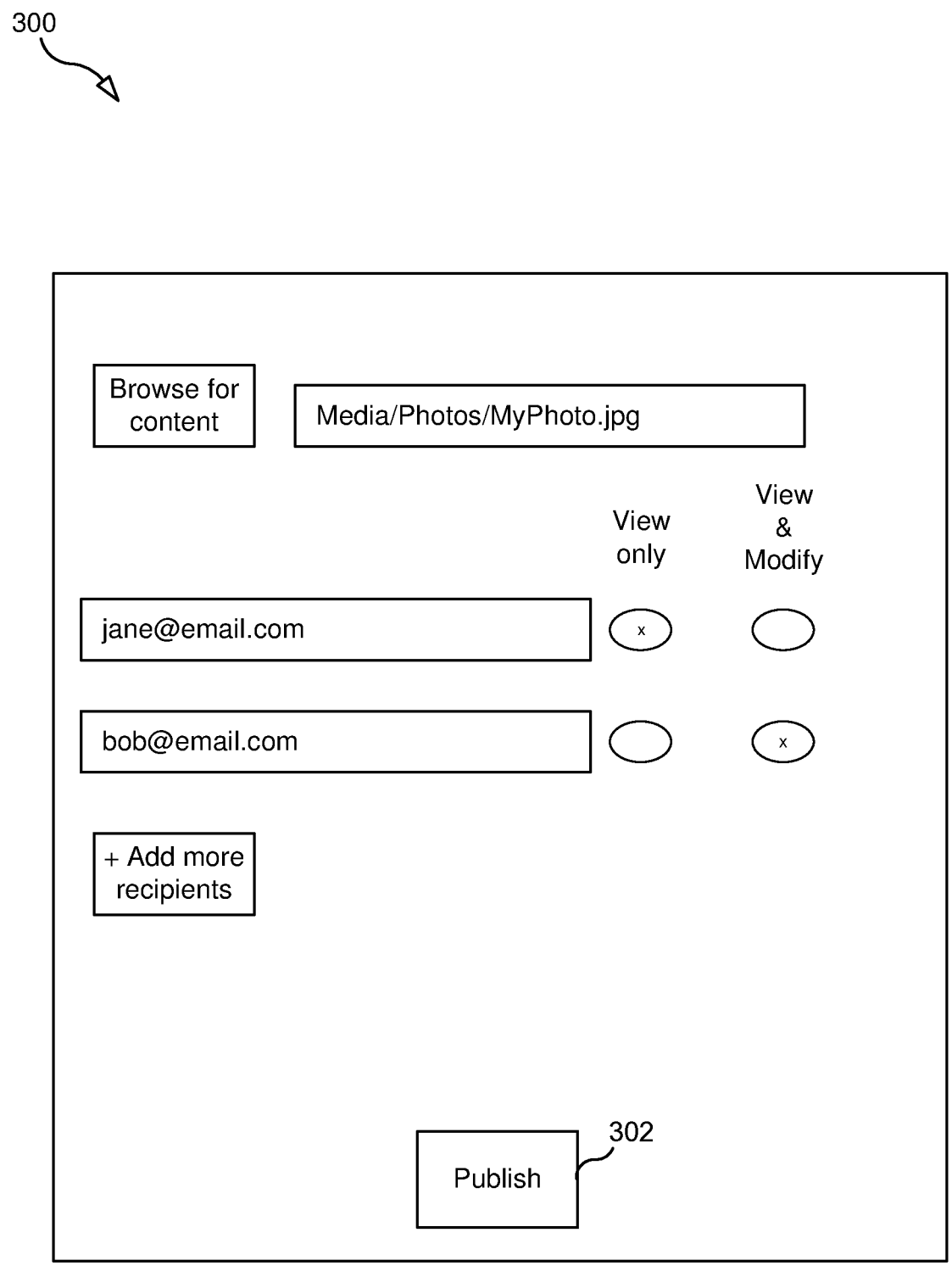
FIG. 3 illustrates an example GUI input form.

FIG. 2 illustrates exemplary components of the group session app 200. In the embodiment shown, group session app 200 includes a graphical user interface (GUI) module 202 that enables user 112 to interact with the app. FIG. 3 is an example GUI input form 300 that may be generated by GUI module 202 for enabling user 112 to select content for sharing, identify the recipients, and, for each, identified recipient specify the operations the recipient may perform (in this example, a recipient may view the shared content or may view and modify the shared content). After user 112 fills out the input form 300 and activates "publish" button 302, a group session controller module 206 (GSC 206) will create a session document based on the entered information and publish the created session document. That is, GSC 206 will transmit the created session document to at least one GSA. In some embodiments, GSC 206 transmits the session document to a single GSA, but in other embodiments GSC 206 transmits the session document to all GSAs of which GCS 206 is aware (e.g., GSC 206 may be pre-configured with a list of GSAs and GSC 206 transmits the session document to each listed GSA).

Figure 10:
FIG. 10 illustrates an example session document according to some embodiments.

FIG. 10 illustrates an exemplary session document 1000 according to some embodiments that is created by GSC 206. Session document 1000 includes: (1) a unique document identifier for identifying the session document; (2) an owner identifier for identifying the owner of the content (i.e., the user who created the session document); (3) a set of one or more rules; (4) encrypted content that can be decrypted using an encryption key (to readily distinguish this encryption key from other encryption keys mentioned herein, this document may refer to this encryption key as the "secret" encryption key because, in normal use, this encryption key that is used to decrypt the encrypted content should be maintained as a secret so that unauthorized users cannot gain access to the encryption key and, thereby have the ability to decrypt the encrypted content); and (5) a set of one or more encrypted versions of the secret encryption key. In one embodiment, each rule in the set of rules includes: (a) a recipient identifier that identifies a recipient, which recipient could be an individual or a group of people (e.g., "friends" of the owner), and (b) information identifying the operations that the identified recipient may perform. Additionally, for each recipient identifier included in the set of rules, the set of encrypted versions of the secret encryption key includes an encrypted version of the secret encryption key that was encrypted using an encryption key (e.g., a public key) associated with the recipient identifier. In some embodiments, the secret encryption key that can be used to decrypt the encrypted content is also the key that is used to encrypt the content to produce the encrypted content. In such an embodiment, the secret key may be randomly generated. In other embodiments, the secret encryption key is different than the encryption key that is used to encrypt the content to be shared (e.g., the key used to encrypt the content may be a public key and the secret key may be a private key corresponding to the public key.)

Thus, using FIG. 3 as an example, in response to user 112 activating the publish button 302, GSC 206 will encrypt the content (MyPhoto.jpg) using an encryption key (e.g., an encryption key randomly generated by GSC 206), thereby creating an encrypted version of the content that can be decrypted using a secret encryption key, which may be identical to the encryption key used to encrypt the content, and, because the "owner" of the content "MyPhoto.jpg" wants to share the content with both Jane and Bob, GCS 206 encrypts the secret encryption key using an encryption key belonging to Jane (e.g., Jane's public key) and encrypts the secret encryption key using an encryption key belonging to Bob (e.g., Bob's public key), thereby generating a first encrypted version of the secret encryption key and a second encrypted version of the secret encryption key. Hence, the session document created by GSC 206 when user 112 activates the publish button 302 includes the encrypted version of the content to be shared plus the first and second encrypted versions of the secret encryption key (i.e., the encryption key that can be used to decrypt the encrypted content). Additionally, the session document will include a first rule indicating that Jane has permission to view the content and a second rule indicating Bob has permission to view and modify the content.

Figure 4:
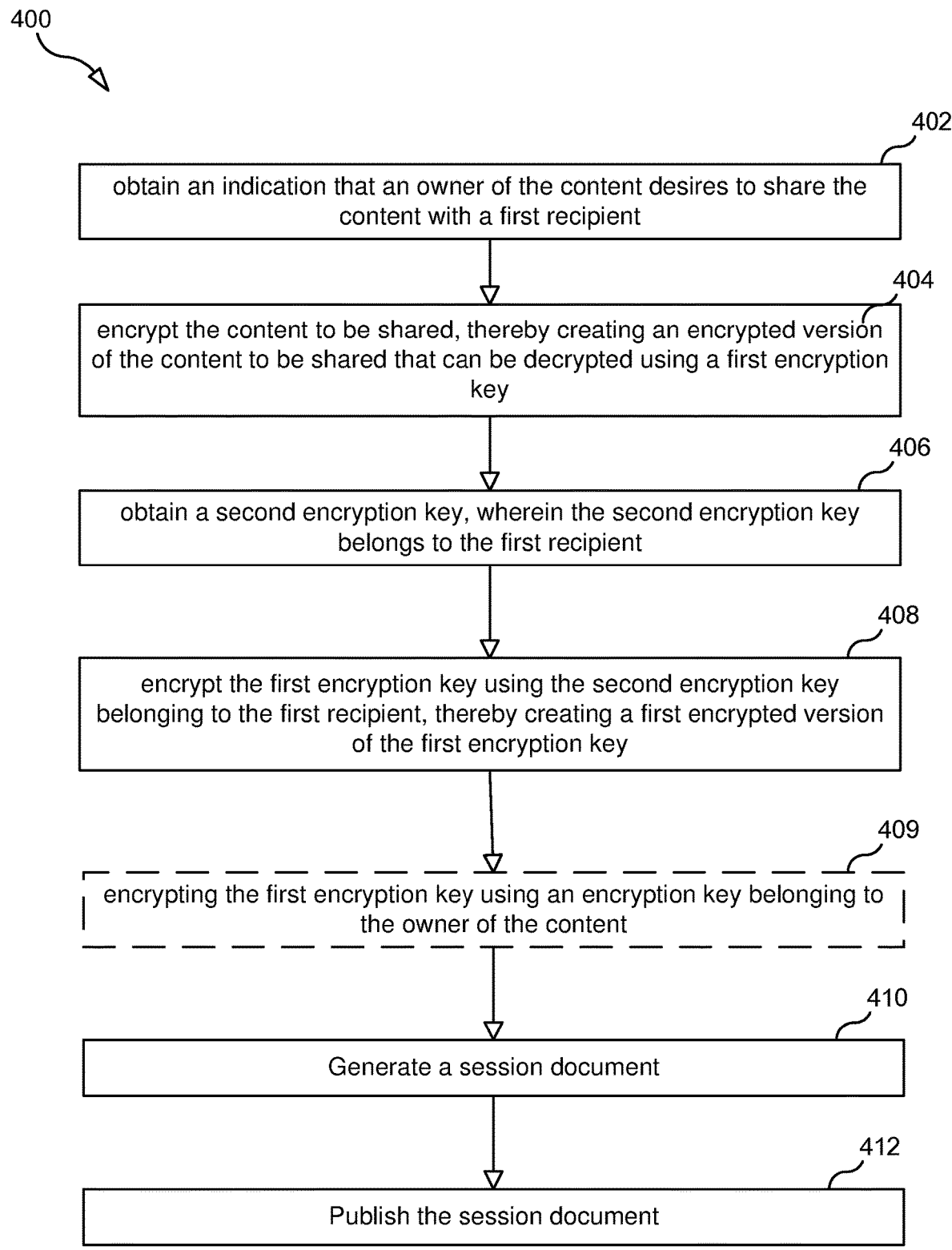
FIG. 4 is a flow chart illustrating a process, according to some embodiments, that is performed by a group session controller.

FIG. 4 is a flow chart illustrating a process 400 for sharing content, which process 400 may be performed by GSC 206.

Process 400 may begin with step 402, in which GSC 206 obtains an indication that an owner of the content desires to share the content with a first recipient. For example, GSC 206 obtains an indication that user 112 has activated publish button 302 after identifying the content to be shared and after identifying one or more recipients.

In step 404, GSC 206 encrypts the content to be shared using an encryption key, thereby creating an encrypted version of the content to be shared that can be decrypted using a first encryption key (a.k.a., the secret encryption key). The first encryption key may be identical to the encryption key used to encrypt the content, which may be a randomly generated encryption key.

In step 406, GSC 206 obtains a second encryption key belonging to the first recipient. In some embodiments, the second encryption key is the first recipient's public key.

In step 408, GSC 206 encrypts the first encryption key using the second encryption key belonging to the first recipient, thereby creating a first encrypted version of the first encryption key.

In step 410, GSC 206 generates a session document, wherein the session document comprises: 1) an owner identifier identifying the owner of the content, 2) a session document identifier for identifying the session document, 3) the first encrypted version of the first encryption key, 4) the encrypted version of the content to be shared, 5) and a rule comprising a first user identifier identifying the first recipient and information indicating a set of operations the first recipient may perform on the session document.

In step 412, GSC 206 publishes the session document. In some embodiments, GSC 206 publishes the session document by transmitting to a GSA a message comprising the session document. In other embodiments, GSC 206 publishes the session document by transmitting to a set of two or more GSAs the message comprising the session document. In some embodiments, the message further comprises a digital signature for use in determining that the session document was generated on behalf of the owner of the content, wherein the digital signature was generated using an encryption key belonging to the owner of the content, such as, for example, a private encryption key (or "private key" for short) associated with the user in the public key cryptography system (asymmetric cryptography). That is, in some embodiments, GSC 206 obtains the owner's private key and generates a digital signature using the private key using known techniques and includes the generated digital signature in the message.

In some embodiments, process 400 also includes the GSC 206 encrypting the first encryption key using an encryption key belonging to the owner of the content (see step 409) (e.g., the owner's public key), thereby creating a second encrypted version of the first encryption key, and the session document further comprises the second encrypted version of the first encryption key.

Figure 5:
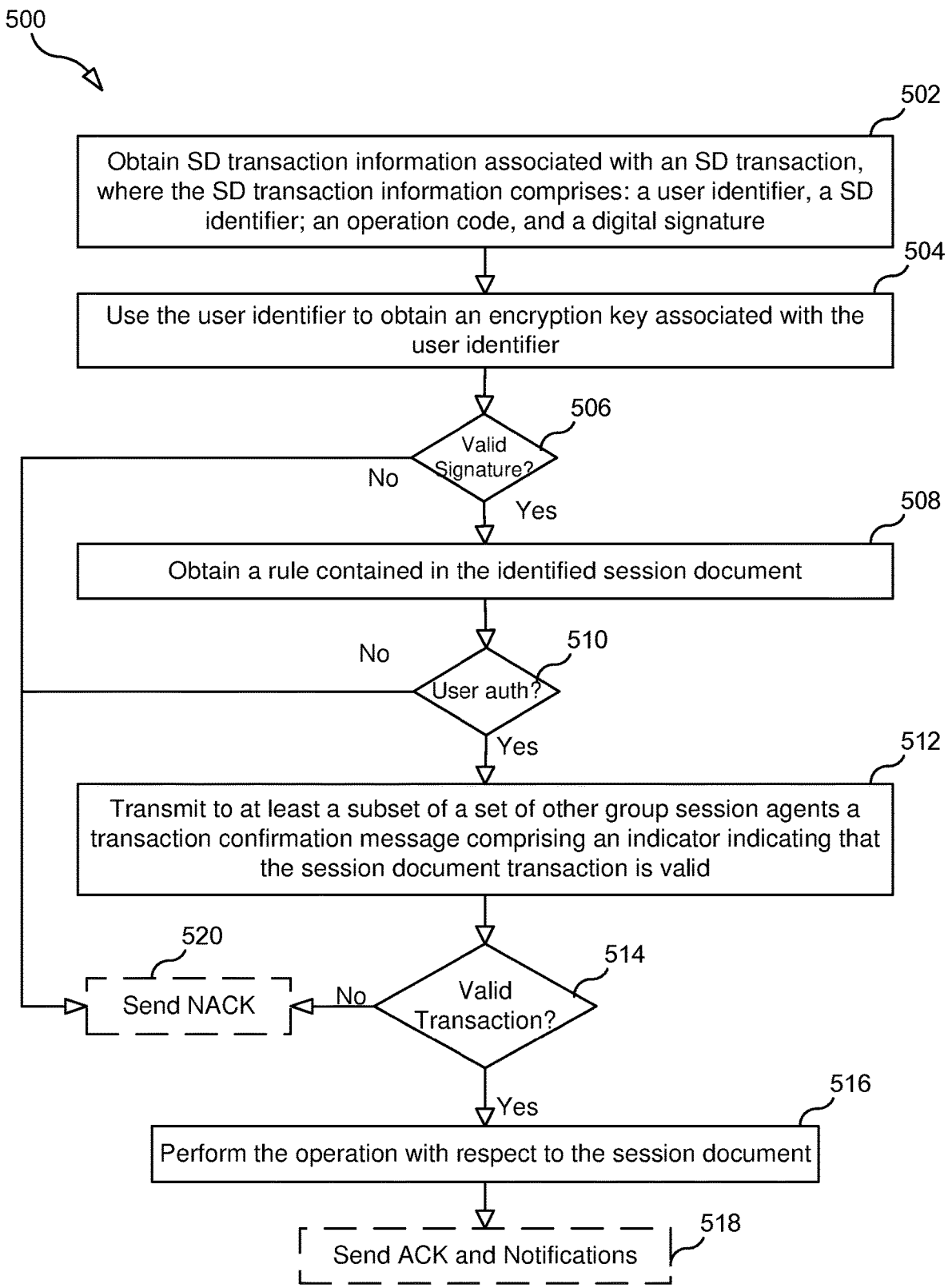
FIG. 5 is a flow chart illustrating a process, according to some embodiments, that is performed by a group session agent.

FIG. 5 is a flow chart illustrating a process 500 for sharing content, which process 500 may be performed by a first GSA (i.e., any one of GSA 121, 122 and 123). Process 500 may begin with step 502, in which the first GSA obtains session document transaction information associated with a session document transaction. In one embodiment, the first GSA obtains the session document transaction information by receiving the session document transaction information forwarded from another GSA (i.e., a second GSA) that received the session document transaction information directly from a user device (e.g., communication device 102). In another embodiment, the first GSA receives the session document transaction information directly from the user device. Accordingly, in either embodiment the session document transaction information was transmitted by the user device.

In some embodiments, the session document transaction information comprises: a first user identifier for identifying a first user; a session document identifier for identifying a session document; an operation code for identifying an operation to be performed with respect to the session document, and a digital signature. For example, the operation code may indicate that the first user desires to obtain or modify the encrypted content data that is included in the identified session document.

In some embodiments, the session document identified by the session document identifier comprises: i) encrypted content data that can be decrypted using a secret encryption key, ii) the first user identifier, and iii) a first encrypted version of the secret encryption key, wherein the first encrypted version of the secret encryption key was encrypted using an encryption key (e.g., public key) belonging to the first user. In some embodiments, the session document further comprises: an owner identifier identifying the owner of the encrypted content and a second encrypted version of the secret encryption key, wherein the second encrypted version of the secret encryption key was encrypted using an encryption key associated with the owner of the encrypted content (e.g., the owner's public key).

In step 504, the first GSA uses the first user identifier to obtain an encryption key associated with the first user identifier (e.g., the first GSA obtains a public key associated with the first user identifier).

In step 506, the first GSA uses the obtained encryption key to determine whether the digital signature is a valid digital signature. For example, in step 506, the first GSA uses the obtained encryption key to generate a digital signature and then compares this generated digital signature with the digital signature obtained in step 502. If the digital signatures match, then the obtained digital signature is a valid digital signature.

In step 508, the first GSA obtains a rule contained in the identified session document.

In step 510, the first GSA determines whether the rule indicates that the first user identified by the first user identifier has the authority to perform the operation on the identified session document (e.g., has the authority to obtain or modify the encrypted content).

In step 512, as a result of determining that the signature is valid and the rule indicates that the user has the authority to perform the operation, the first GSA transmits to at least a subset of a set of other GSAs (e.g., a second GSA and a third GSA) a transaction confirmation message comprising an indicator indicating that the session document transaction is valid.

In step 514, the first GSA determines the validity of the session document transaction using a distributed consensus algorithm such as, for example, a proof-of-work algorithm, a proof-of-stake algorithm, or a traditional distributed consensus algorithm like the practical *byzantine* fault tolerance algorithm. In some embodiments, determining the validity of the session document transaction using the distributed consensus algorithm comprises determining whether at least a certain number of other GSAs included in said set of other GSAs have determined that the session document transaction is valid. In some embodiments, the first GSA will determine that at least the certain number of other GSAs have determined that the session document transaction is valid by receiving from each of at least N (N>0) of the other GSAs a transaction confirmation message comprising an indicator indicating that the session document transaction is valid.

In step 516, as a result of determining that at least the certain number of other GSAs have determined that the session document transaction is valid, the first GSA performs the operation with respect to the session document stored in the first GSA's corresponding database. In some embodiments, each of the other GSA in system 100 will also perform process 500. For example, in some embodiments, each other GSA will obtain the same session document transaction information as was obtained by the first GSA in step 502. For example, in some embodiments, the transaction confirmation message transmitted by the first GSA to the other GSAs further comprises the obtained session document transaction information, and in other embodiments the GSC that transmitted the session document transaction information broadcasts the session document transaction information (e.g., transmits the session document transaction information to each GSA). In this way, the databases 131-133 will stay synchronized. Moreover, since, in some embodiments, the transaction are stored in a blockchain and each block contains the hash of the previous block, the GSAs will never come to consensus if they don't agree on previous history of transactions. In other word, they not only need to agree on the validity of new transaction but also the all previous history, which is much stronger and one of the benefits of a blockchain.

For example, if the obtained operation code indicates that the first user desires to modify the encrypted content data, then in step 516, the first GSA will modify the identified session document stored in its corresponding database and each of the other GSA's will modify the identified session document stored in its corresponding database, thereby maintaining synchronization.

As another example, in some embodiments, if the obtained operation code indicates that the first user desires to obtain the encrypted content data, then in step 516, the first GSA will obtain from the identified session document the encrypted content data and the appropriate encrypted version of the secret encryption key that is stored in the session document in association with the first user identifier (e.g., the first GSA retrieves the session document from its corresponding database and extracts the encrypted content data and the first encrypted version of the secret encryption key from the retrieved session document) and transmit the obtained encrypted content and encrypted secret encryption key to the first user's device.

In step 518 (optional), the first GSA sends an ACK to the first user's device and may also send one or more notifications. For example, if a recipient modified the encrypted content, then in step 518 the first GSA may provide a notification of this event to the owner as well as to the other recipients identified in the session document, if any. Similarly, if the owner modified the encrypted content, then in step 518 the first GSA provides a notification of this event to the recipients identified in the session document. Likewise, if an owner creates a new session document that is added to the databases 131-133, then a notification may be provided to the recipients, if any, identified in the session document.

In step 520 (optional), in the event that either the digital signature is not valid or the first user is not authorized to perform the operation, then the first GSA may send a NACK to the first user's device.

Figure 6:
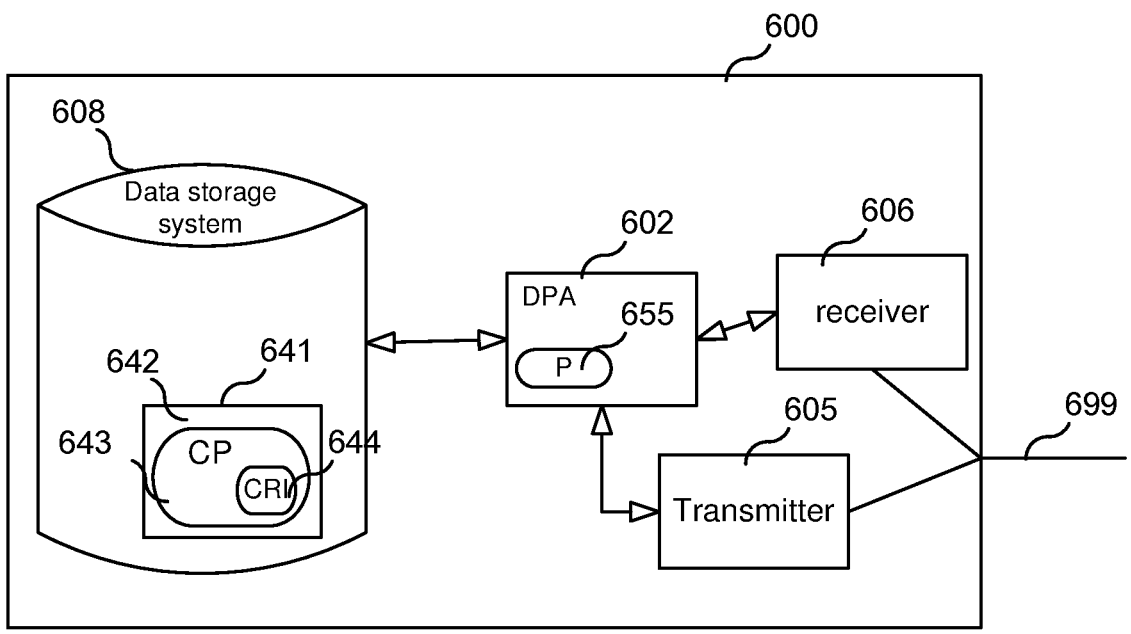
FIG. 6 is a block diagram of an apparatus for implementing one or more GSAs.

FIG. 6 is a block diagram of a computer apparatus 600 for executing one or more of the GSAs. That is, in some embodiments, for each of the above described GSAs, the system 100 has a separate computer apparatus 600 for executing the GSA, but in other embodiments, one or more GSAs may be implemented using only a single computer apparatus 600. As described below, computer apparatus 600 may consists of a single data processing apparatus or set of data processing apparatuses (i.e., computer apparatus 600 may be a cloud computing system).

As shown in FIG. 6, computer apparatus 600 includes at least one data processing apparatus (DPA) 602, which may include one or more processors 655 (e.g., one or more general purpose microprocessors and/or one or more data processing circuits, such as an application specific integrated circuit (ASIC), field-programmable gate arrays (FPGAs), logic circuits, and the like). In some embodiments, computer apparatus 600 includes a plurality of DPAs 602, which may or may not be co-located. Thus, the above described GSAs may be implemented in a cloud computing environment. In some embodiments, each GSA may correspond to a virtual machine hosted by computer apparatus 600. Computer apparatus 600 further includes: a transmitter interface 605 and a receiver 606 for use in transmitting and receiving data, respectively, via a communications link 699; and a data storage system 608, which may include one or more non-volatile storage devices and/or one or more volatile storage devices (e.g., random access memory (RAM)). In embodiments where data processing apparatus 602 includes a microprocessor, a computer program product (CPP) 641 may be provided. CPP 641 includes a computer readable medium (CRM) 642 storing a computer program (CP) 643 comprising computer readable instructions (CRI) 644. CRM 642 may be a non-transitory computer readable medium, such as, but not limited, to magnetic media (e.g., a hard disk), optical media (e.g., a DVD), memory devices (e.g., random access memory), and the like, but not a signal. In some embodiments, the CRI of computer program 643 is configured such that when executed by data processing apparatus 602, the CRI causes the data processing apparatus 602 to perform steps described above. In other embodiments, apparatus 602 may be configured to perform steps described herein without the need for code. That is, for example, apparatus 602 may consist merely of one or more ASICs. Hence, the features of the embodiments described herein may be implemented in hardware and/or software.

Figure 7:
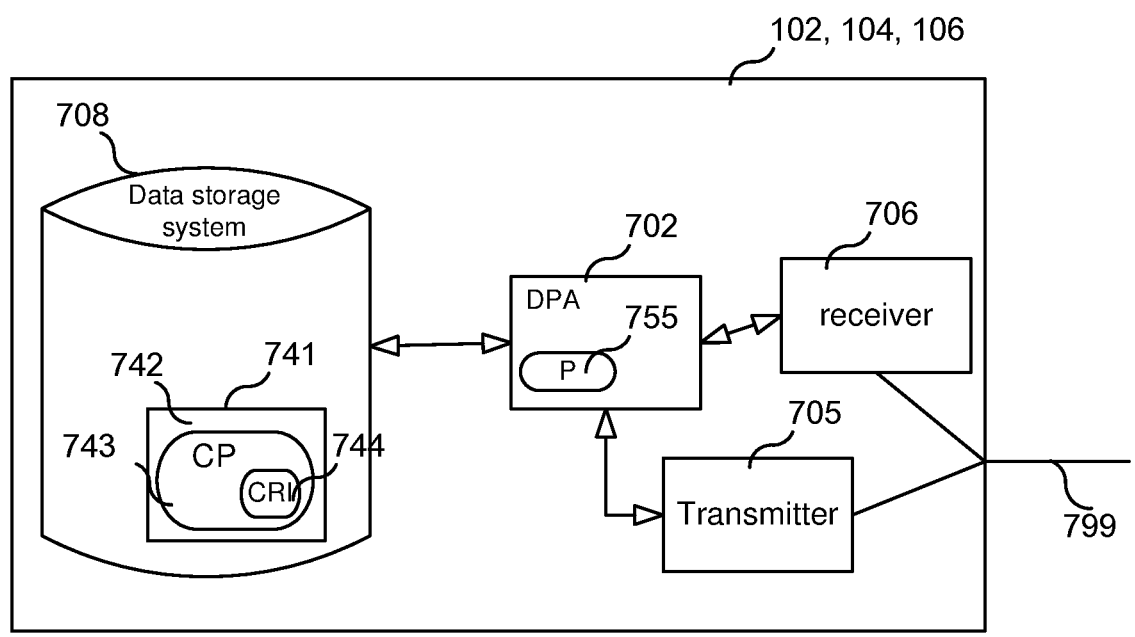
FIG. 7 is a block diagram of a communication device according to some embodiments.

FIG. 7 is a block diagram of a communication devices 102, 104, and 106. As shown in FIG. 7, the communication devices include at least one data processing apparatus (DPA) 702, which may include one or more processors 755 (e.g., one or more general purpose microprocessors and/or one or more data processing circuits, such as an application specific integrated circuit (ASIC), field-programmable gate arrays (FPGAs), logic circuits, and the like). The communication devices further include: a transmitter 705 and a receiver 706 for use in transmitting and receiving data, respectively, via a communications link 799; and a data storage system 708, which may include one or more non-volatile storage devices and/or one or more volatile storage devices (e.g., random access memory (RAM)). In embodiments where data processing apparatus 702 includes a microprocessor, a computer program product (CPP) 741 may be provided. CPP 741 includes a computer readable medium (CRM) 742 storing a computer program (CP) 743 comprising computer readable instructions (CRI) 744. CRM 742 may be a non-transitory computer readable medium, such as, but not limited, to magnetic media (e.g., a hard disk), optical media (e.g., a DVD), memory devices (e.g., random access memory), and the like, but not a signal. In some embodiments, the CRI of computer program 743 is configured such that when executed by data processing apparatus 702, the CRI causes the data processing apparatus 702 to perform steps described above. In other embodiments, apparatus 702 may be configured to perform steps described herein without the need for code. That is, for example, apparatus 702 may consist merely of one or more ASICs. Hence, the features of the embodiments described herein may be implemented in hardware and/or software.

Figure 8:
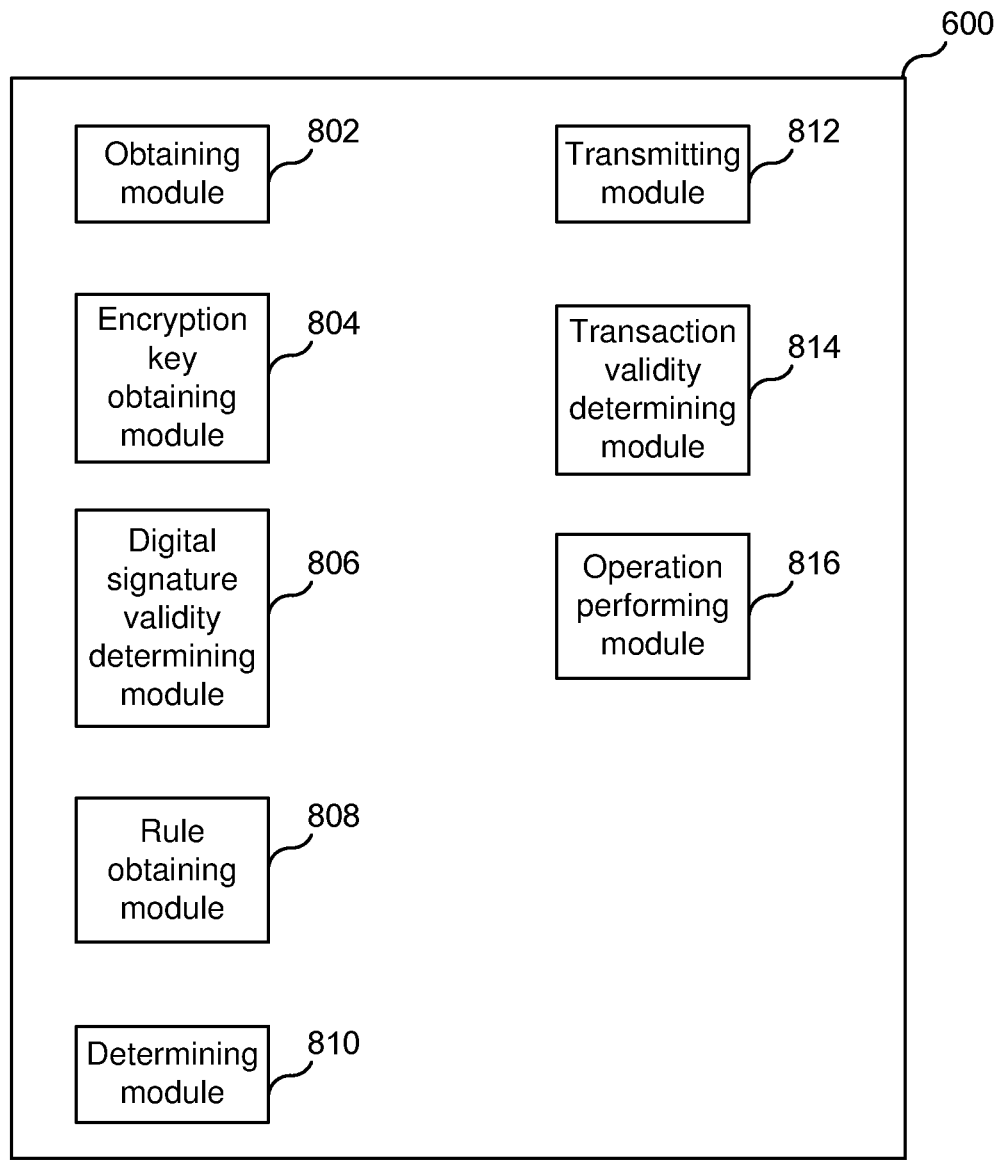
FIG. 8 schematically illustrates, in terms of a number of functional modules, components of a computing apparatus according to some embodiments.

FIG. 8 schematically illustrates, in terms of a number of functional modules, components of computing apparatus 600. As shown in FIG. 8 computer apparatus 600 comprises a number of functional modules, including: an obtaining module 802 for obtaining session document transaction information associated with a session document transaction, wherein the session document transaction information was transmitted by a user device, and the session document transaction information comprises: a first user identifier for identifying a first user, a session document identifier for identifying a session document; an operation code for identifying an operation to be performed with respect to the session document, and a digital signature; an encryption key obtaining module 804 for using the first user identifier to obtain an encryption key associated with the first user identifier; a digital signature validity determining module 806 for using the obtained encryption key to determine whether the digital signature is a valid digital signature; a rule obtaining module 808 for obtaining a rule contained in the session document identified by the session document identifier; a determining module 810 for determining whether the rule indicates that the first user identified by the first user identifier has the authority to perform the operation on the identified session document; a transmitting module 812 configured such that, as a result of determining that the signature is valid and the rule indicates that the user has the authority to perform the operation, the transmitting module employs a transmitter to transmit to at least a subset of a set of other GSAs a transaction confirmation message comprising an indicator indicating that the session document transaction is valid, said set of other GSAs including a second GSA and a third GSA; a transaction validity determining module 814 for determining the validity of the session document transaction using a distributed consensus algorithm; and an operation performing module 816 for performing the operation with respect to the session document as a result of determining that the session document transaction is valid. It should be understood that the modules 802, 804, 806, 808, 810, 812, 814, and 816 in one embodiment may be enabled through software instructions and in another embodiment through hardware, such as ASICs and DSPs, and in further embodiments through a mix of hardware and software.

Figure 9:
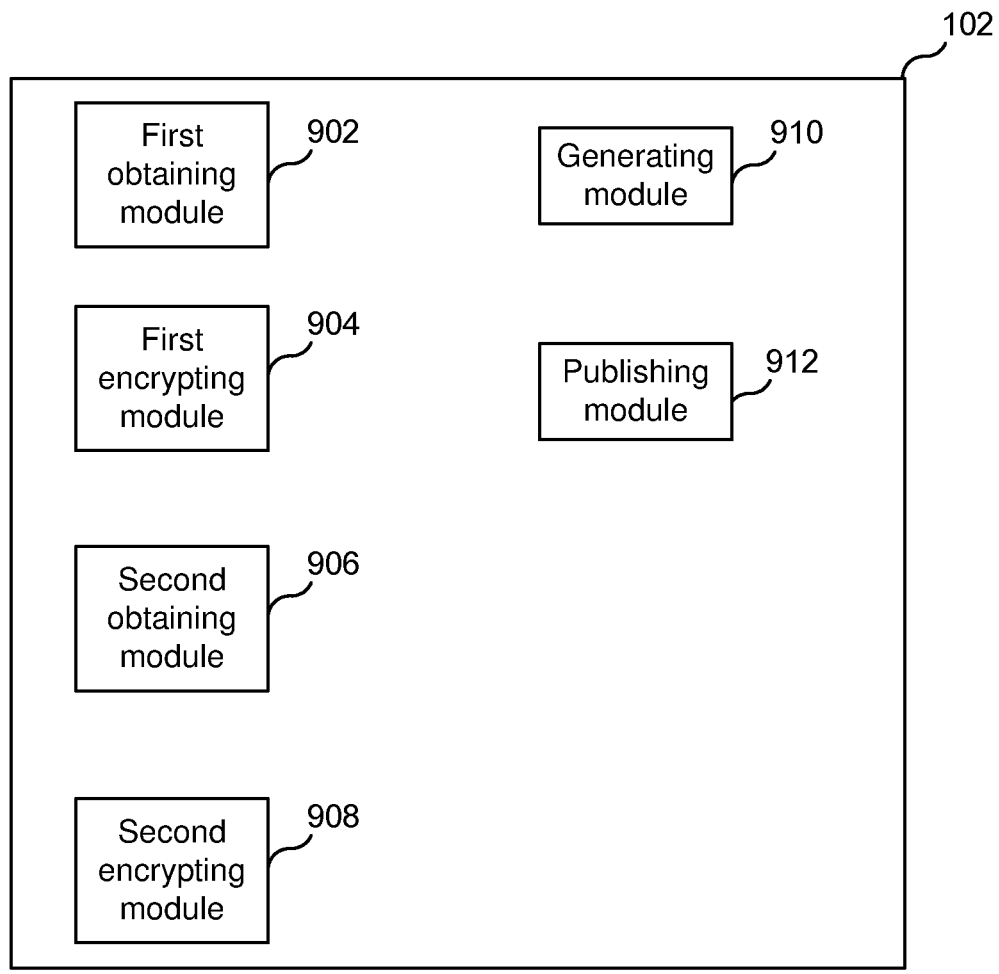
FIG. 9 schematically illustrates, in terms of a number of functional modules, components of a communication device according to some embodiments.

FIG. 9 schematically illustrates, in terms of a number of functional modules, components of communication device 102. As shown in FIG. 9 communication device 102 comprises a number of functional modules, including: a first obtaining module 902 for receiving an indication that an owner of the content desires to share the content with a first recipient; a first encrypting module 904 for encrypting the content to be shared, thereby creating an encrypted version of the content to be shared, wherein the encrypted version of the content to be shared can be decrypted using a first encryption key; a second obtaining module 906 for obtaining a second encryption key, wherein the second encryption key belongs to the first recipient; a second encrypting module 908 for encrypting the first encryption key using the second encryption key belonging to the first recipient, thereby creating a first encrypted version of the first encryption key; a generating module 910 for generating a session document, wherein the session document comprises: 1 an owner identifier identifying the owner of the content, 2 a session document identifier for identifying the session document, 3 the first encrypted version of the first encryption key, 4 the encrypted version of the content to be shared, 5 and a rule comprising a first user identifier identifying the first recipient and information indicating a set of operations the first recipient may perform on the session document; and a publishing module 912 for publishing the session document. It should be understood that the modules 902, 904, 906, 908, 910 and 912 in one embodiment may be enabled through software instructions and in another embodiment through hardware, such as ASICs and DSPs, and in further embodiments through a mix of hardware and software.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for sharing content, comprising:
obtaining, at a first group session agent (GSA), session document transaction information associated with a session document transaction, wherein the session document transaction information was transmitted by a user device, and the session document transaction information comprises: a first user identifier for identifying a first user, a session document identifier for identifying a session document; an operation code for identifying an operation to be performed with respect to the session document, and a digital signature;
the first GSA using the first user identifier to obtain an encryption key associated with the first user identifier;
the first GSA determining whether the digital signature is a valid digital signature using the obtained encryption key;
the first GSA obtaining a rule contained in the session document identified by the session document identifier;
the first GSA determining whether the rule indicates that the first user identified by the first user identifier has the authority to perform the operation on the identified session document;
as a result of determining that the signature is valid and the rule indicates that the user has the authority to perform the operation, the first GSA transmitting to at least a subset of a set of other GSAs a transaction confirmation message comprising an indicator indicating that the session document transaction is valid, said set of other GSAs including a second GSA and a third GSA;
the first GSA determining the validity of the session document transaction using a distributed consensus algorithm, wherein determining the validity of the session document transaction using the distributed consensus algorithm comprises determining whether at least a certain number of other GSAs included in said set of other GSAs have determined that the session document transaction is valid; and as a result of determining that at least the certain number of other GSAs have determined that the session document transaction is valid, the first GSA performing the operation with respect to the session document.

2. The method of claim 1, wherein the transaction confirmation message further comprises the obtained session document transaction information.

3. The method of claim 1, wherein the session document comprises: i) encrypted content data, wherein the encrypted content data can be decrypted using a secret key, ii) the first user identifier, and ii) a first encrypted version of the secret key, wherein the first encrypted version of the secret key was encrypted using an encryption key belonging to the first user.

4. The method of claim 3, wherein performing the operation with respect to the session document comprises the first GSA transmitting to the first user the first encrypted version of the secret key and the encrypted content data.

5. The method of claim 4, wherein the session document further comprises: an owner identifier identifying the owner of the encrypted content and a second encrypted version of the secret key, wherein the second encrypted version of the secret key was encrypted using and encryption key associated with the owner of the encrypted content.

6. A method for sharing content, the method comprising:
obtaining an indication that an owner of the content desires to share the content with at least a first recipient and a second recipient;
encrypting the content to be shared, thereby creating an encrypted version of the content to be shared, wherein the encrypted version of the content to be shared can be decrypted using a secret key;
obtaining a first encryption key, wherein the first encryption key belongs to the first recipient;
obtaining a second encryption key, wherein the second encryption key belongs to the second recipient;
encrypting the secret key using the first encryption key belonging to the first recipient, thereby creating a first encrypted version of the secret key;
encrypting the secret key using the second encryption key belonging to the second recipient, thereby creating a second encrypted version of the secret key;
generating a session document, wherein the session document comprises: 1) an owner identifier identifying the owner of the content, 2) a session document identifier for identifying the session document, 3) the first encrypted version of the secret key, 4) the encrypted version of the content to be shared, 5) a first rule comprising a first user identifier identifying the first recipient and information indicating a first set of operations the first recipient may perform on the session document; 6) the second encrypted version of the secret key, and 7) a second rule comprising a second user identifier identifying the second recipient and information indicating a second set of operations the second recipient may perform on the session document; and
publishing the session document.

7. The method of claim 6, wherein
the method further comprises encrypting the secret key using an encryption key belonging to the owner of the content, thereby creating a third encrypted version of the secret key, and
the session document further comprises the third encrypted version of the secret key.

8. The method of claim 6, wherein publishing the session document comprises transmitting to a group session agent (GSA) a message comprising the session document.

9. The method of claim 8, wherein publishing the session document comprises transmitting to a set of two or more GSAs the message comprising the session document.

10. The method of claim 8, wherein the message further comprises a digital signature for use in determining that the session document was generated on behalf of the owner of the content, wherein the digital signature was generated using a private key belonging to the owner of the content.

11. The method of claim 6, wherein encrypting the content to be shared comprises encrypting the content using the secret key.

12. The method of claim 6, wherein encrypting the content to be shared comprises encrypting the content using a public encryption key, wherein the secret key is not the public encryption key.

13. The method of claim 12, wherein
the public encryption key is paired with a private key, and
the secret key is the private key that is paired with the public encryption key.

14. A group session agent apparatus comprising:
a processor; and
a memory, said memory containing instructions executable by said processor whereby said group session agent apparatus is operative to:
obtain session document transaction information associated with a session document transaction, wherein the session document transaction information was transmitted by a user device, and the session document transaction information comprises: a first user identifier for identifying a first user, a session document identifier for identifying a session document; an operation code for identifying an operation to be performed with respect to the session document, and a digital signature;
use the first user identifier to obtain an encryption key associated with the first user identifier;
use the obtained encryption key to determine whether the digital signature is a valid digital signature;
obtain a rule contained in the session document identified by the session document identifier;
determine whether the rule indicates that the first user identified by the first user identifier has the authority to perform the operation on the identified session document;
as a result of determining that the signature is valid and the rule indicates that the user has the authority to perform the operation, transmit to at least a subset of a set of other GSAs a transaction confirmation message comprising an indicator indicating that the session document transaction is valid, said set of other GSAs including a second GSA and a third GSA;
determine the validity of the session document transaction using a distributed consensus algorithm, wherein the apparatus is configured to determine the validity by determining whether at least a certain number of other GSAs included in said set of other GSAs have determined that the session document transaction is valid; and
as a result of determining that at least the certain number of other GSAs have determined that the session document transaction is valid, perform the operation with respect to the session document.

15. The group session agent apparatus of claim 14, wherein the transaction confirmation message further comprises the obtained session document transaction information.

16. The group session agent apparatus of claim 14, wherein the session document comprises: i) encrypted content data, wherein the encrypted content data can be decrypted using a secret key, ii) the first user identifier, and a iii) first encrypted version of the secret key, wherein the first encrypted version of the secret key was encrypted using an encryption key belonging to the first user.

17. The group session agent apparatus of claim 16, wherein
the apparatus is configured to perform the operation with respect to the session document by transmitting to the first user the first encrypted version of the first encryption key and the encrypted content data, and
the session document further comprises: an owner identifier identifying the owner of the encrypted content and a second encrypted version of the secret key, wherein the second encrypted version of the secret key was encrypted using and encryption key associated with the owner of the encrypted content.

18. A communication device for sharing content, the communication device comprising:
a processor; and
a memory, said memory containing instructions executable by said processor whereby said communication device is operative to:
obtain an indication that an owner of the content desires to share the content with at least a first recipient and a second recipient;
encrypt the content to be shared, thereby creating an encrypted version of the content to be shared, wherein the encrypted version of the content to be shared can be decrypted using a secret key;
obtain a first encryption key, wherein the first encryption key belongs to the first recipient;
encrypt the secret key using the first encryption key belonging to the first recipient, thereby creating a first encrypted version of the secret key;
obtain a second encryption key, wherein the second encryption key belongs to the second recipient;
encrypt the secret key using the second encryption key belonging to the second recipient, thereby creating a second encrypted version of the secret key;
generate a session document, wherein the session document comprises: 1) an owner identifier identifying the owner of the content, 2) a session document identifier for identifying the session document, 3) the first encrypted version of the secret key, 4) the encrypted version of the content to be shared, 5) a first rule comprising a first user identifier identifying the first recipient and information indicating a first set of operations the first recipient may perform on the session document; 6) the second encrypted version of the secret key, and 7) a second rule comprising a second user identifier identifying the second recipient and information indicating a second set of operations the second recipient may perform on the session document; and
publish the session document.

19. The communication device of claim 18, wherein
the communication device is further adapted to encrypt the secret key using an encryption key belonging to the owner of the content, thereby creating a third encrypted version of the secret key, and
the session document further comprises the third encrypted version of the secret key.

20. The communication device of claim 18, wherein the communication is adapted to publish the session document by transmitting to a group session agent (GSA) a message comprising the session document.

21. The communication device of claim 20, wherein the message further comprises a digital signature for use in determining that the session document was generated on behalf of the owner of the content, wherein the digital signature was generated using a private key belonging to the owner of the content.

22. A computer program product comprising a non-transitory computer readable medium storing a computer program comprising instructions which, when executed on at least one processor of a group session agent (GSA), cause the GSA to carry out a method comprising:
obtaining, at a first group session agent (GSA), session document transaction information associated with a session document transaction, wherein the session document transaction information was transmitted by a user device, and the session document transaction information comprises: a first user identifier for identifying a first user, a session document identifier for identifying a session document; an operation code for identifying an operation to be performed with respect to the session document, and a digital signature;
using the first user identifier to obtain an encryption key associated with the first user identifier;
determining whether the digital signature is a valid digital signature using the obtained encryption key;
obtaining a rule contained in the session document identified by the session document identifier;
determining whether the rule indicates that the first user identified by the first user identifier has the authority to perform the operation on the identified session document;
as a result of determining that the signature is valid and the rule indicates that the user has the authority to perform the operation, transmitting to at least a subset of a set of other GSAs a transaction confirmation message comprising an indicator indicating that the session document transaction is valid, said set of other GSAs including a second GSA and a third GSA;
determining the validity of the session document transaction using a distributed consensus algorithm, wherein determining the validity of the session document transaction using the distributed consensus algorithm comprises determining whether at least a certain number of other GSAs included in said set of other GSAs have determined that the session document transaction is valid; and
as a result of determining that at least the certain number of other GSAs have determined that the session document transaction is valid, performing the operation with respect to the session document.

23. A computer program product comprising a non-transitory computer readable medium storing a computer program comprising instructions which, when executed on at least one processor, cause the at least one processor to carry out a method comprising:
obtaining an indication that an owner of the content desires to share the content with at least a first recipient and a second recipient;
encrypting the content to be shared, thereby creating an encrypted version of the content to be shared, wherein the encrypted version of the content to be shared can be decrypted using a first encryption key;

obtaining a first encryption key, wherein the first encryption key belongs to the first recipient;

encrypting the secret key using the first encryption key belonging to the first recipient, thereby creating a first encrypted version of the secret key;

obtaining a second encryption key, wherein the second encryption key belongs to the second recipient;

encrypting the secret key using the second encryption key belonging to the second recipient, thereby creating a second encrypted version of the secret key;

generating a session document, wherein the session document comprises: 1) an owner identifier identifying the owner of the content, 2) a session document identifier for identifying the session document, 3) the first encrypted version of the secret key, 4) the encrypted version of the content to be shared, 5) first a rule comprising a first user identifier identifying the first recipient and information indicating a first set of operations the first recipient may perform on the session document; 6) the second encrypted version of the secret key, and 7) a second rule comprising a second user identifier identifying the second recipient and information indicating a second set of operations the second recipient may perform on the session document; and publishing the session document.

\* \* \* \* \*